United States Patent [19]

Costa et al.

[11] 3,804,990

[45] Apr. 16, 1974

[54] PCM TELECOMMUNICATION SYSTEM HAVING MEANS FOR TEMPORARY DEGRADATION OF VOICE CHANNELS UNDER OVERLOAD CONDITIONS

[75] Inventors: Gianmario Costa, Cornaredo (Milan); Giancarlo Monti, Milan; Isidoro Poretti, Castiglione Olona (Varese); Alvaro Bagnoli, Milan, all of Italy

[73] Assignee: Societa Italiana Telecomunicazioni Siemens S.p.A., Milan, Italy

[22] Filed: Dec. 29, 1972

[21] Appl. No.: 319,178

[30] Foreign Application Priority Data

Dec. 29, 1971 Italy ................................ 33073/71

[52] U.S. Cl. .... 179/15 AS, 179/15 AP, 179/15 BW

[51] Int. Cl. ............................................. H04j 5/00

[58] Field of Search ........ 179/15 BW, 15 A, 15 AP, 179/15 AT, 15 BV, 15 AS

[56] References Cited

UNITED STATES PATENTS

| | | | |
|---|---|---|---|
| 3,424,869 | 1/1969 | Anderson | 179/15 AS |
| 3,466,398 | 9/1969 | Fraser | 179/15 AS |
| 3,649,766 | 3/1972 | La Marche | 179/15 AS |
| 3,660,605 | 5/1972 | Rees | 179/15 AS |

*Primary Examiner*—Ralph D. Blakeslee
*Attorney, Agent, or Firm*—Karl F. Ross; Herbert Dubno

[57] ABSTRACT

A terminal of a pulse-code-modulation (PCM) time-division multiple-access (TDMA) telecommunication system, serving for the exchange of digitized message samples in the form of interleaved multibit pulse codes between a multiplicity of local voice channels and a like number of remote voice channels accessible through another terminal, includes at least one processing station serving several $n$-channel groups whose incoming lines are periodically sampled by respective group coders working into a common multiplexer. A processor inserted between each group coder and the multiplexer comprises a pair of alternately operative shift registers which receive only the coded voice samples from active lines, as determined by a monitoring circuit including a multiplicity of voice detectors, and subsequently discharge them at an accelerated rate in an intermittent code sequence for intercalation in a PCM frame with similar code sequences from other processors of the station. The voice detectors deliver an activity pattern for all the $n$ channels of the corresponding group to an allocation-message generator provided with an $n$-stage input memory and an n-stage operating memory; characteristic bits representing active stages are transferred, stage by stage, from the input memory to the operating memory while an electronic sequencer, taking $n$ steps per frame, scans the input memory to determine the number $k$ of such bits present in each frame. An arithmetic unit, including several pulse counters and a comparator, divides this number $k$ into the maximum number $s$ of a communication time slots allotted to the group in an assigned subframe of the multiplexer; the quotient $s/k$ determines the number $b$ of bits per code word to be transmitted from this particular group, this number being reduced from its normal value $b_{max}$=8 to 7, 6, 5 or 4 in the case of overload. A similar arithmetic unit at the associated receiving station controls a decoder for the truncated code words in response to an allocation-message extractor analogous to the allocation-message generator of the transmitting station.

10 Claims, 8 Drawing Figures

PCM TELECOMMUNICATION SYSTEM HAVING MEANS FOR TEMPORARY DEGRADATION OF VOICE CHANNELS UNDER OVERLOAD CONDITIONS

FIELD OF THE INVENTION

Our present invention relates to a PCM (pulse-code modulation) telecommunication system of the time-division multiple-access (TDMA) type in which messages consisting of voice-frequency signals are periodically sampled (e.g. as to amplitude) and translated into digital form, i.e. into multibit pulse codes, for transmission to a remote destination in interleaved relationship with similar multibit codes of other messages traveling over the same signal path.

BACKGROUND OF THE INVENTION

In commonly owned U.S. Pat. application, Ser. No. 244,578 filed 17 Apr. 1972 by one of us, Giancarlo Monti, there has been disclosed a system of this general type wherein digitized message samples in the form of multibit pulse codes are transmitted from a first station over a signal path to a remote second station for the exchange of information between a number of groups of local voice channels served by each station, each channel including an incoming and an outgoing line. The incoming lines of each group terminate at a respective group coder having access to a multiplexer, this access being controlled by a gate in response to a binary activity pattern that is stored in a memory and periodically updated under the control of respective monitoring units which test the instantaneous conditions of the several incoming lines feeding each group coder, i.e., which ascertain the presence or absence of voice currents on such lines. The gate blocks the inscription of blank codes from inactive lines in a shift register individually assigned to each group, this register therefore containing only significant code words from active lines which are read out at high speed to the multiplexer together with allocation bits derived from the activity pattern to inform the remote terminal of the origins of the individual pulse codes in a code sequence transmitted during a frame of, say, 125 $\mu$s. The frame comprises a predetermined number of communication time slots, allotted to the several channel groups, as well as additional time slots for a number of allocation bits constituting part of an allocation message which identifies the active channels and is transmitted in its entirety in a predetermined number of successive frames. At the remote terminal, the reverse procedure is followed with restoration of the individual code words to their original relative time position, in respective sampling intervals of a frame, for distribution to their respective destinations as determined by decoding equipment responsive to the allocation message.

The number of communication time slots allotted to the several channel groups should be sufficient to handle normal traffic. Under overload conditions, however, the number of active lines may exceed the number of available time slots whereupon a supervisory counter halts the sampling of the channels by the monitoring units which generate the activity pattern so that some of these channels are denied access to the associated group coders and are therefore excluded from communication. Since the activity pattern determines the contents of the allocation message which requires a series of frames for its transmission, the duration of such a frame series or superframe represents the minimum delay for resumption of voice transmission over a temporarily excluded channel. If, for the sake of verification, it is desired to repeat each allocation message several times to insure a correct response of the address decoder at the remote terminal, this exclusion period is correspondingly multiplied.

In our copending application Ser. No. 315,897, filed Dec. 18, 1972, there has been disclosed a system of this general type designed to reduce the exclusion period of any channel under the described overload conditions by distributing that exclusion over all the participating channels so that communication over a single channel is interrupted for not more than the duration of one frame.

OBJECTS OF THE INVENTION

The general object of our present invention is to provide an advantageous alternative solution to the overload problem which does not exclude any active channel, even for a brief period, but distributes the overload over all participating channels in the form of some degradation of the transmitted voice signals by truncating the corresponding code words, i.e., by lowering the number $b$ of such bits from a normal value (e.g., 8) to a correspondingly reduced value.

An ancillary object is to provide means in such a system for establishing the reduced bit number $b$ of a truncated code word at the highest value consistent with the existing overload condition.

SUMMARY OF THE INVENTION

These objects are realized, in accordance with our present invention, by the provision of an allocation-message generator which includes an $n$-stage input memory and an $n$-stage operating memory, $n$ being the number of intervals per frame (e.g. 30, as in the example given in the prior Monti application) assigned to each group coder for the sampling of the incoming lines of the associated channel group. The input memory is loaded with bits representing the binary activity pattern supplied by the associated monitoring units, this information being periodically updated. The contents of the input memory are transmitted, stage by stage, to the operating output memory and are also scanned by a sequencer taking $n$ steps per frame; the scanning of a characteristic bit indicative of an active line (usually a true bit) in the input memory generates an output pulse which is transmitted to an arithmetic unit, the number $k$ of such output pulses per frame thus denoting the number of active channels. The arithmetic unit divides this number $k$ into the maximum number $s$ of available time slots, i.e., the number of communication time slots (as distinct from allocation time slots) allotted to the corresponding channel group in an assigned subframe of the multiplexer.

The input memory may be designed as an orthogonal array with $m$ rows of $q$ stages each, the $q$ allocation bits transmitted in any one frame to the remote station being derived from a single row of such stages. By shifting from one row to the next only once in every succession of $p$ frames where $p$ is an integer greater than 1 (e.g., 3), we insure the repetitive transmission of each allocation bit in a superframe.

The allocation message, stored in the operating memory, controls the elimination of blank codes from the incoming PCM signals in a processor that consolidates the remaining code words, representing the digitized voice samples of active channels, into an intermittent code sequence consisting of code groupings into which the $q$-bit fraction of the allocation message is also inserted. The inscription of each incoming code word in the processor is controlled by a timing signal, recurring $n$ times per frame, whose duration normally encompasses the maximal number $b_{max}$ of bits per code word, i.e., 8 bits in the specific case here considered measured at the cadence of a relatively slow train of clock pulses which control the operation of the associated group coder. Normally, i.e., if no overload exists, $s \geq k \cdot b_{max}$, i.e., the number of available time slots equals or exceeds 8 times the number of active channels. If, however, the quotient $s/k$ is less than 8, the arithmetic unit performing the division $s \div k$ reduces the length of the timing pulses to that of a series of $b$ bits where $b$ equals the integral part of that quotient. This results in a value of $b$ equal to $b_{max} - 1$, $b_{max} - 2$, etc., depending on the degree of overload. The resulting code groupings, including the original or truncated code words corresponding to the voice samples of all the active channels of the group, are read out at the cadence of a relatively fast train of clock pulses to the multiplexer for intercalation with similar code sequences from other group coders, in respective subframes of a frame, for transmission over the signal path to the remote station. There, a retrieval network extracts the allocation bits from the output of a demultiplexer so as to reconstitute the original allocation message in the course of a superframe, this network being provided with storage means similar to those of the allocation-message generator including an input memory. An arithmetic unit similar to that of the transmitting station performs the same calculation, i.e., the determination of the quotient $s/k$, to modify the duration of timing signals controlling the read-out of the code words from a processor which receives the intermittent code sequence from the demultiplexer for distribution of its interleaved voice codes to their respective destinations. The requisite parallelism between the allocation-message generator and the allocation-message retriever at opposite ends of the signal path, as well as between the corresponding arithmetic units, is ensured by synchronizing signals which mark the beginning (or the end) of each subframe, frame and superframe.

According to a more specific feature of our invention, the arithmetic unit on the transmitting side (as well as its counterpart on the receiving side) comprises a first pulse counter which obtains the output pulses from the associated sequencer and works into a comparator also connected to a second counter receiving, at a later time in a frame, a train of reference pulses whose number $s$ corresponds to the number of available time slots. As soon as the count of reference pulses fed into the comparator reaches the number $k$ registered by the first counter, a third counter is stepped while the second counter is reset to resume the counting of the reference pulses. This third counter thus takes as many steps as correspond to the integral part of the quotient $s/k$, up to $b_{max}$ steps (here 8) at which point a flip-flop is set to block the further stepping of that counter. All the counters are periodically reset once per frame, prior to the commencement of the counting of the bit transfers from active channels.

BRIEF DESCRIPTION OF THE DRAWING

The above and other features of our invention will now be described in detail with reference to the accompanying drawing in which:

FIG. 2 is a circuit diagram of the receiving side of the same station (or of a remote station communicating therewith)

SPECIFIC DESCRIPTION

Figure 1:
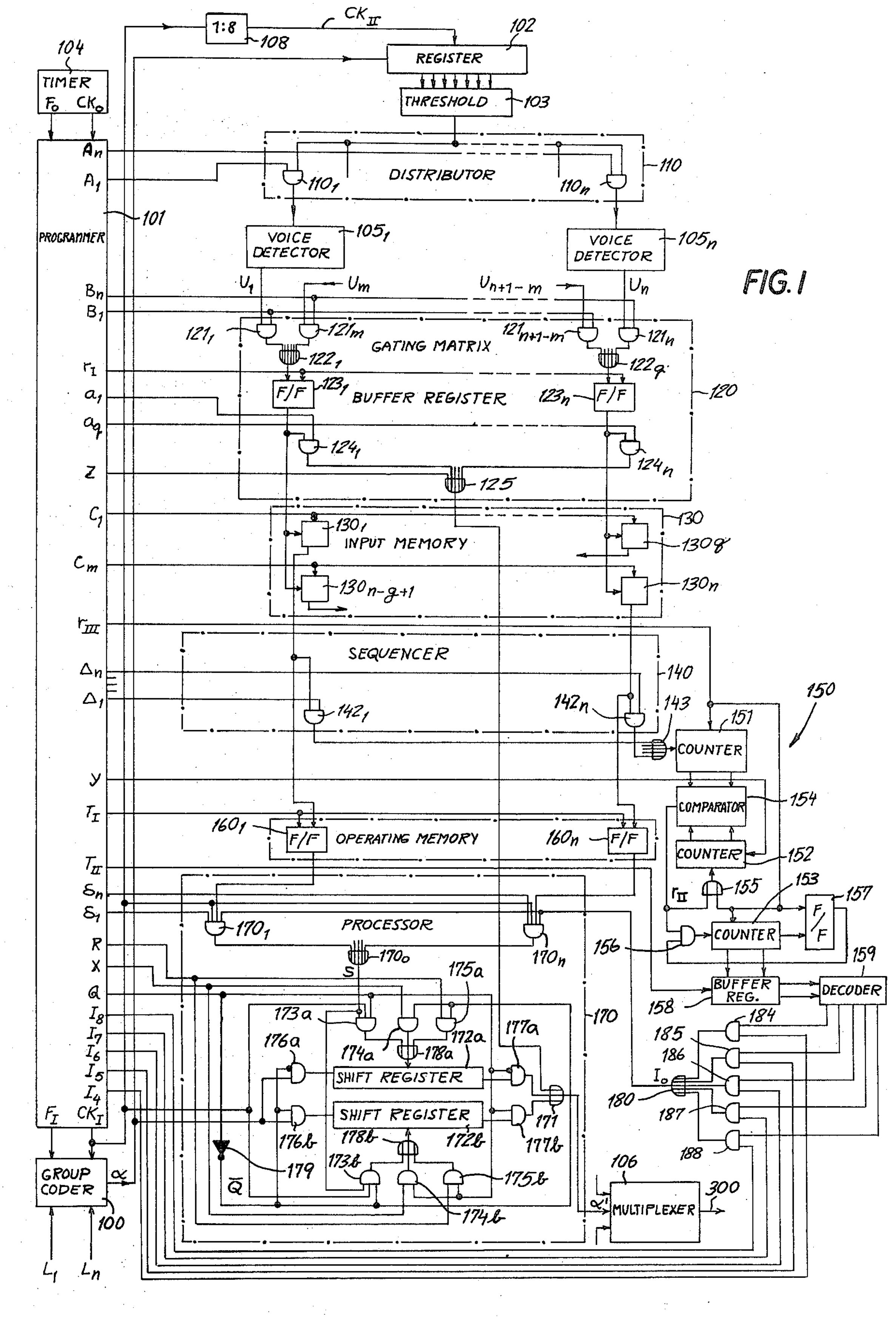
FIG. 1 is a circuit diagram of the transmission side of a station forming part of a PCM telecommunication system according to the invention.
Figure 2:
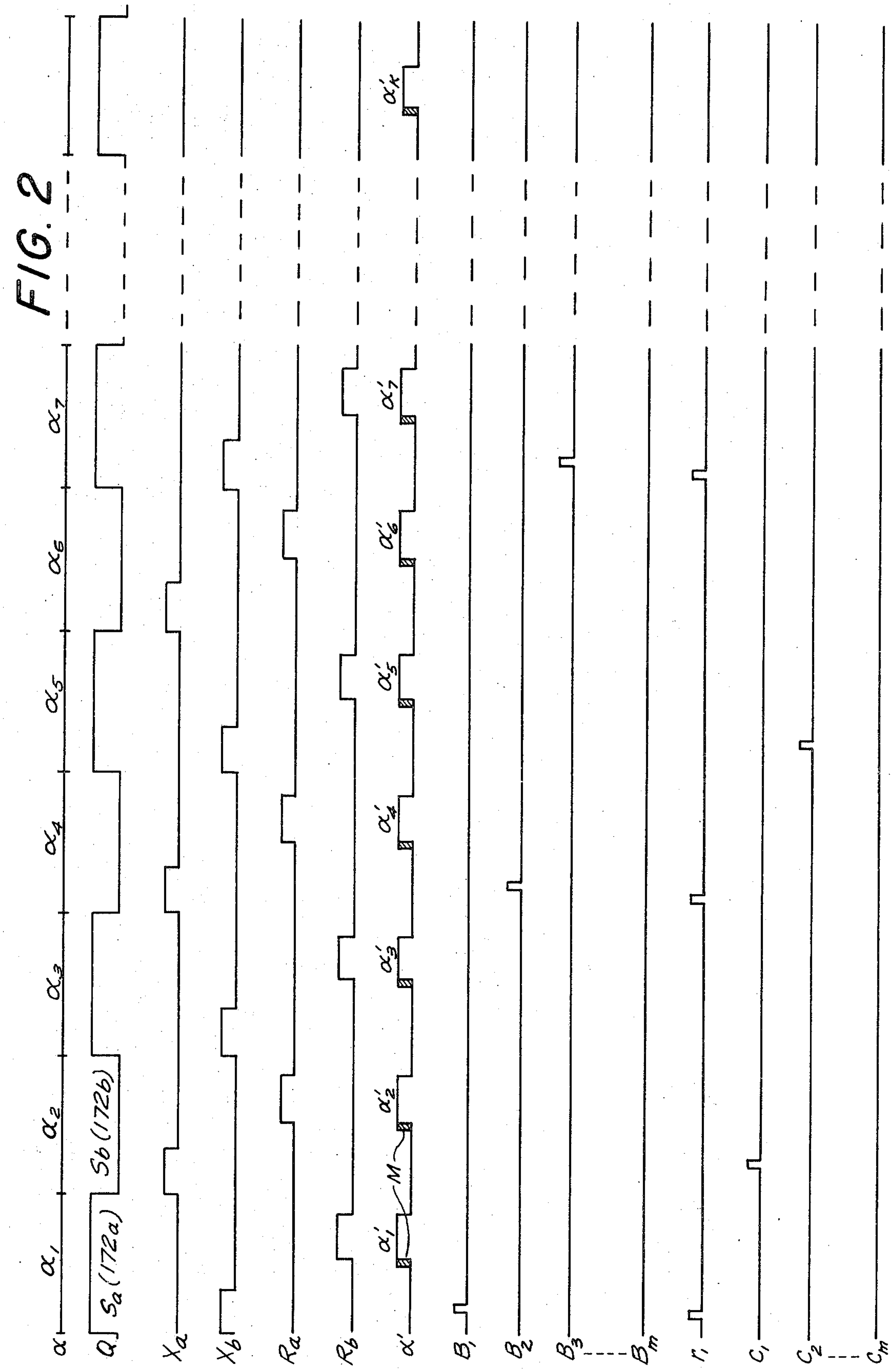
FIGS. 2, 3 and 4 are sets of graphs relating to the operation of the transmission circuits of FIG. 1.

In FIG. 1 a group coder 100, controlled by a programmer 101, synthesizes a code sequence $\alpha$ from speech signals arriving over a number of incoming lines $L_1 - L_n$ (see also FIG. 2). This continuous code sequence is transmitted, on the one hand, to a processor 170 for conversion into an intermittent code sequence $\alpha'$, with exclusion of the blank codes from idle lines, and on the other hand to a register 102 in the input of a digital threshold circuit 103. Register 102 has eight stages to accommodate the eight bits of a code word received from an active line during a sampling interval of $125/n$ $\mu$s, the register being periodically discharged into threshold circuits 103 in response to a series of test pulses $CK_{ll}$ which are derived from a train of low-rate clock pulses $CK_l$ in the output of programmer 101 through an 1:8 frequency divider 108. Threshold circuit 103 determines whether the digitized signal level of any incoming line $L_l - L_n$ does or does not equal (or exceed) a predetermined minimum level and, if it does, generates an output which is fed in parallel to a plurality of AND gates $\mathbf{110}_l - \mathbf{110}_n$ in a distributor 110. AND geates $\mathbf{110}_l - \mathbf{110}_n$ are sequentially unblocked, during consecutive sampling intervals, by respective pulses $A_l - A_n$ (see also FIG. 3) from programmer 101 which receives from a time 104 a train of high-rate clock pulses $CK_o$ as well as a periodic frame-start pulse $F_o$ recurring every 125 $\mu$s.

AND gates $\mathbf{110}-\mathbf{110}_n$ (of which only the first and the last one have been illustrated) work into respective voice detectors $\mathbf{105}_l - \mathbf{105}_n$ which are essentially integrators and monitor the activity of lines $L_l - L_n$, respectively; if the decoded signal level in the output of threshold 103 (as integrated over a number of successive frames) surpasses a predetermined value, the voice detector has an output $U_l - U_n$.

The number $n$ of channels per group (only one such group being considered in the present description) is the product of two integers $m$, $q$ enabling a division of the several voice detectors $\mathbf{105}_l - \mathbf{105}_n$ into $q$ subgroups of $m$ detectors each. The outputs $U_l - U_m$ of the first subgroup are fed into respective AND gates $\mathbf{121}_l - \mathbf{121}_m$ of a gating matrix 120 working into a common OR gate $\mathbf{122}_l$. Similarly, the outputs $U_{n+l-m} - U_m$ of the last subgroup are fed into respective AND gates $\mathbf{121}_{n+l-n} - \mathbf{121}_n$ of that matrix working into a common OR gate $\mathbf{122}_q$. The intervening, analogous stages of this gating matrix have not been illustrated. Corresponding AND gates of each subgroup are unblocked in parallel by the programmer 101 with the aid of pulses $B_l - B_m$ staggered at intervals of 475 $\mu$s, equal to $p = 3$ frames.

Thus, pulse $B_l$ is delivered to the first AND gate $121_l$, . . . $121_{n+l-m}$ of each subgroup whereas pulse $B_m$ reaches the last AND gate $121_m$, . . . $121_n$ thereof.

Each OR gate $122_l - 122_q$, upon conducting, sets a respective flip-flop $123_l - 123_q$ forming a stage of a *q*-stage buffer register included in gating matrix 120. These flip-flops are jointly resettable by a pulse $r_I$ from programmer 101, recurring at the same cadence (i.e., once every three frames) as the gating pulses $B_l - B_m$. The set outputs of flip-flops $123_l - 123_q$ are delivered to an input memory 130 of an allocation-message generator and, in parallel therewith, to a set of AND gates $124_l - 124_q$ also included in matrix 120. The latter AND gates, sequentially unblocked by respective pulses $a_l - a_q$ from programmer 101, work into a common OR gate 125 which additionally receives a synchronizing pulse Z immediately following the pulse $a_q$. The output of OR gate 125 is delivered to an OR gate 171 in processor 170 for transmission to a multiplexer 106 as part of the intermittent code sequence $\alpha'$ which is sent to a remote station via a signal path 300.

Input memory 130 comprises an orthogonal array of *n* binary stages divided into *m* rows of stages $130_l - 130_q$, . . . $130_{n-q+l} - 130_n$. The first stage of each row is connected to the set output of flip-flop $123_l$ whereas the last stage is connected to the set output of flip-flop $123_q$; the intervening stages, analogously connected, have not been illustrated. The stages of each row are read out simultaneously by respective transfer pulses $C_l - C_m$ from programmer 101 which trail the corresponding gating pulses $B_l - B_m$ by approximately a frame length.

An *n*-stage operating memory 160 consists of flip-flops $160_l - 160_n$ with setting inputs respectively connected to the set outputs of flip-flops $130_l - 130_n$. A transfer pulse $T_I$ from programmer 101, applied at the beginning of each frame to an enabling input of every flip-flop of memory 160, updates the contents of that memory in conformity with any changes that may have occurred in the setting of the corresponding stages of memory 130. These stages also work into respective AND gates $142_l - 142_n$ of a sequencer 140 that are successively unblocked, in an early part of each frame, by respective pulses $\Delta_l - \Delta_n$ from the programmer.

Figure 3:
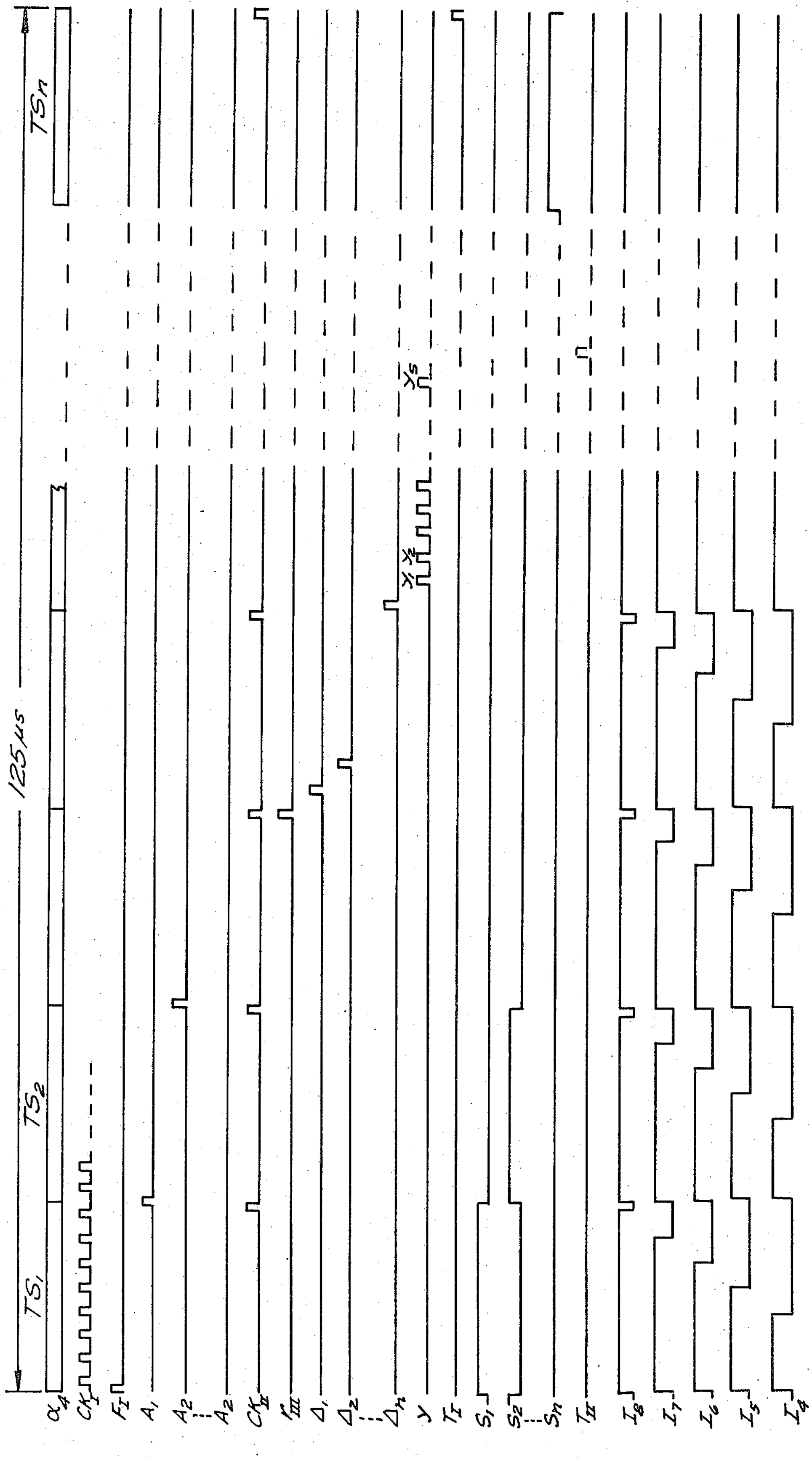

Processor 170 comprises a set of *n* AND gates $170_l - 170_n$ respectively connected to the set outputs of flip-flops $160_l - 160_n$; programmer 101 sequentially applies unblocking pulses $\delta_l - \delta_n$ to these AND gates during each frame (cf. FIG. 3). The processor further includes two identical shift registers 172*a*, 172*b* which operate alternately, during odd-numbered and even-numbered frames as indicated in FIG. 2, to convert the incoming continuous code sequence $\alpha$ into the intermittent outgoing sequence $\alpha'$. This alternation is controlled by the programmer through a signal Q in the form of a square wave which is fed directly to an AND gate 173*a*, associated with register 172*a*, and to a pair of AND gates 174*b*, 175*b* associated with register 172*b;* its complement $\overline{Q}$ is applied through an inverter 179 to an AND gate 173*b*, associated with register 172*b*, and to two AND gates 174*a*, 175*a* associated with register 172*a*. The direct signal Q also reaches an inverting input of an AND gate 177*a* and a noninverting input of an AND gate 177*b* respectively connecting the outputs of registers 172*a* and 172*b* to OR gate 171; its complement $\overline{Q}$ from inverter 179 is applied to an inverting input of an AND gate 176*a* and to a noninverting input of an AND gate 176*b* through which the code sequence $\alpha$ is transmitted to registers 172*a* and 172*b*, respectively. Two OR gates 178*a* and 178*b*, serving to energize respective stepping inputs of registers 172*a* and 172*b* receive the outputs of AND gates 173*a*, 174*a*, 175*a* and 173*b*, 174*b*, 175*b*, respectively.

The two processor halves 172*a*–178*a* and 172*b*–178*b* being identical, only the first one will be described in detail.

Register 172*a* is of the type described in prior application, Ser. No. 244,578, divided into two sections each having *n* stages for the storage of eight bits each. With input gate 176*a* unblocked in the presence of a pulse Q, the first section of this register is serially loaded during a writing phase with the bits of code sequency $\alpha$ at the relatively low cadence of clock pulses $CK_I$ delivered by the programmer 101 to the group coder 100 jointly with a recurrent starting pulse $F_I$ marking the beginning of each sampling interval (see also FIG. 3). These clock pulses $CK_I$ are applied to a third input of AND gate 173*a* so as to command the shifting of register 172*a* during the writing phase whenever gate 173*a* is unblocked by an output S of any one of the AND gates $170_l - 170_n$ delivered to it via an OR gate $170_o$. This writing phase has been indicated in FIG. 2 at $S_a$ and $S_b$ for registers 172 *a* and 172*b*, respectively.

Each of the AND gates $170_l - 170_n$ of processor 170 has a third input, receiving the clock pulses $CK_I$ from programmer 101, and a fourth input energized via a lead $I_o$ from an OR gate 180 energizable by an arithmetic unit 150. This unit includes a first pulse counter 151 receiving, via an OR gate 143, the output pulses of all the AND gates $142_l - 142_n$ of sequencer 140 generated upon the transfer of a true bit from one of the stages of input memory 130 to a corresponding stage of operating memory 160. A second pulse counter 152 receives from programmer 101, after the disappearance of the last sequencing pulse $\Delta_n$, a train of reference pulses *y* occurring at the rate of the clock pulses $CK_I$, i.e. pulses $Y_1, Y_2 \ldots Y_s$ (see FIG. 3), whose number *s* corresponds to the number of communication time slots available in the subframe assigned to this channel group. The two counters 151 and 152 work into a comparator 154 generating a pulse $r_{II}$ whenever these counts are equal; this pulse resets the counter 152 by way of an OR gate 155 and, through an AND gate 156, steps a third counter 153 of eight stages. AND gate 156 is normally conductive, its second input being tied to the reset output of a flip-flop 157 whose setting input is energized by the counter 153 upon the registration of the eighth comparator pulse $r_{II}$. Counters 151, 152 and 153, as well as flip-flop 157 if set, are periodically reset by a pulse $r_{III}$ emitted once per frame by the programmer, this pulse reaching the counter 152 through the OR gate 155.

Thus, the counter 153 registers a maximum numerical value $b_{max} = 8$ whenever the number of reference pulses *y* equals or exceeds eight times the number *k* of active channels as registered by counter 151. Otherwise, counter 153 stops at an earlier stage. The contents of this counter are stored in a buffer register 158 from which they are discharged, in response to a command pulse $T_{II}$, to a decoder 159 whose five outputs terminate at respective AND gates 184, 185, 186, 187, 188 working into the OR gate 180. These AND gates also receive, directly from programmer 101, respective timing pulses $I_4$, $I_5$, $I_6$, $I_7$, $I_8$ of staggered duration as illustrated in FIG. 3. Thus, pulse $I_4$ spans a series of four clock pulses $CK_I$ whereas pulses $I_5 - I_8$ extend over progressively longer periods of 5, 6, 7 and 8 clock pulses, respectively. Decoder 159 causes the unblocking of gate 184, 185, 186, 187 or 188 if the count last reached by the counter 153 has the value 4, 5, 6, 7 or 8, respectively. Thus, depending on the value of this count, the AND gates $170_I - 170_n$ of processor 170 are enabled for periods of 4, 5, 6, 7, or 8 clock pulses to generate an output S of variable length for the control of gates 173*a* and 173*b*. The timing pulse on lead $I_o$, therefore, determines by its length the number *b* of bits per code word written in shift register 172*a* (or 172*b*).

Figure 4:
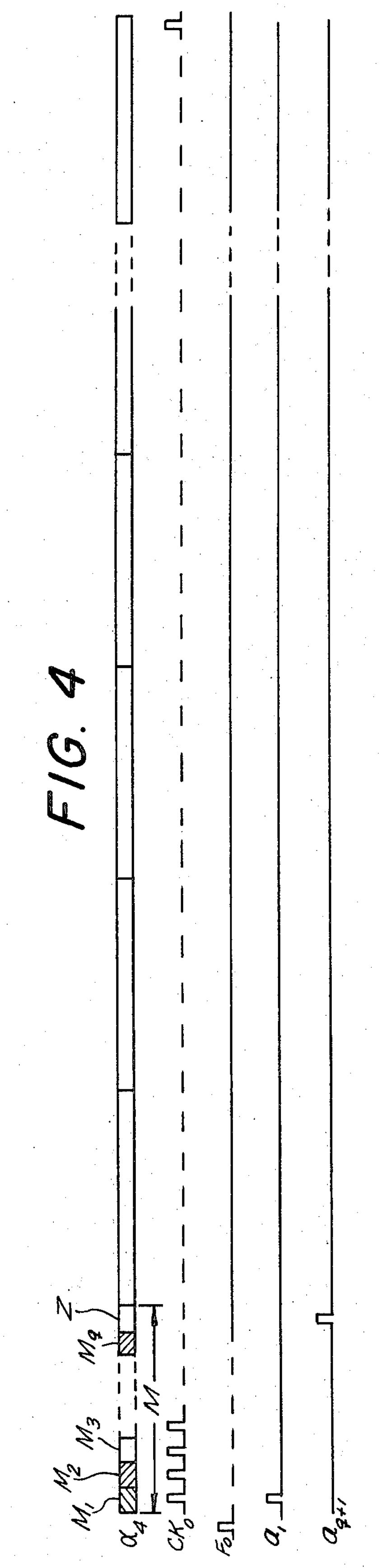

In the ensuing reading phase of register 172*a*, during which the companion register 172*b* is being loaded, the bits stored in the first section of register 172*a* are serially transferred at high rate to its second section in response to a train of shifting pulses X applied by programmer 101 to gate 174*a* during an initial period $X_a$ of that phase; FIG. 2 shows also the corresponding transfer period $X_b$ for register 172*b*. Thereafter, a train of reading pulses R applied by the programmer 101 to gate 175*a* discharges the contents of the second register section at relatively high speed (i.e. at the cadence of clock pulses $CK_o$) via AND gate 177*a* and OR gate 171 to multiplexer 106 as part of the intermittent code sequence $\alpha'$; the corresponding unloading periods have been indicated in FIG. 2 at $R_a$ for register 172*a* and at $R_b$ for register 172*b*. The consolidated code groupings $\alpha'_1, \alpha'_2$ etc., which also include groups of allocation bits M as shown in FIGS. 2 and 4, are much shorter than the frames $\alpha_1, \alpha_2$. Multiplexer 106, accordingly, can intercalate a plurality of such groupings from different group coders in respective subframes of a single frame, possibly with the addition of supplemental or dummy bits to fill any unutilized time slots of a frame as described in the earlier Monti application. In this connection it should be noted that the various intervals $X_a$, $X_b$ and $R_a$, $R_b$, though shown as of identical length in FIG. 2, actually differ in duration according to the number of active lines and therefore to the number of message bits to the transferred and read out.

In FIG. 3 we have shown one of the frames of FIG. 2, specifically the frame $\alpha_4$, which encompasses the *n* sampling intervals $TS_I - TS_n$ assigned to the several lines $L_I - L_n$ of the channel group here considered; the lines of the other groups feeding the multiplexer 106 are sampled in the same rhythm. Each sampling interval contains eight clock pulses $CK_I$ and terminates with a test pulse $CK_{II}$ which just precedes the corresponding monitoring pulse $A_1$, $A_2$ etc. The frame begins with start pulse $F_I$ and ends with updating pulse T. Pulses $\delta_1 - \delta_n$ last each for the duration of a sampling interval and are just slightly longer than the longest timing pulse $I_8$.

FIG. 4 shows one of the outgoing code groupings of sequence $\alpha'$, specifically the grouping $\alpha'_4$, with its allocation part M consisting of bits $M_I - M_q$ and synchronizing bit Z preceding the voice codes $Y_I - Y_k$ of *k* channels found to be active. The corresponding subframe is introduced by a start pulse $F_o$ which is followed, at the cadence of clock pulses $CK_o$, by the gating pulses $a_I - a_q$ that control the composition of the allocation message. Synchronizing bit Z has a true value only in every third frame, as counted from the beginning of a superframe marked by another start pulse not shown.

Figure 5:
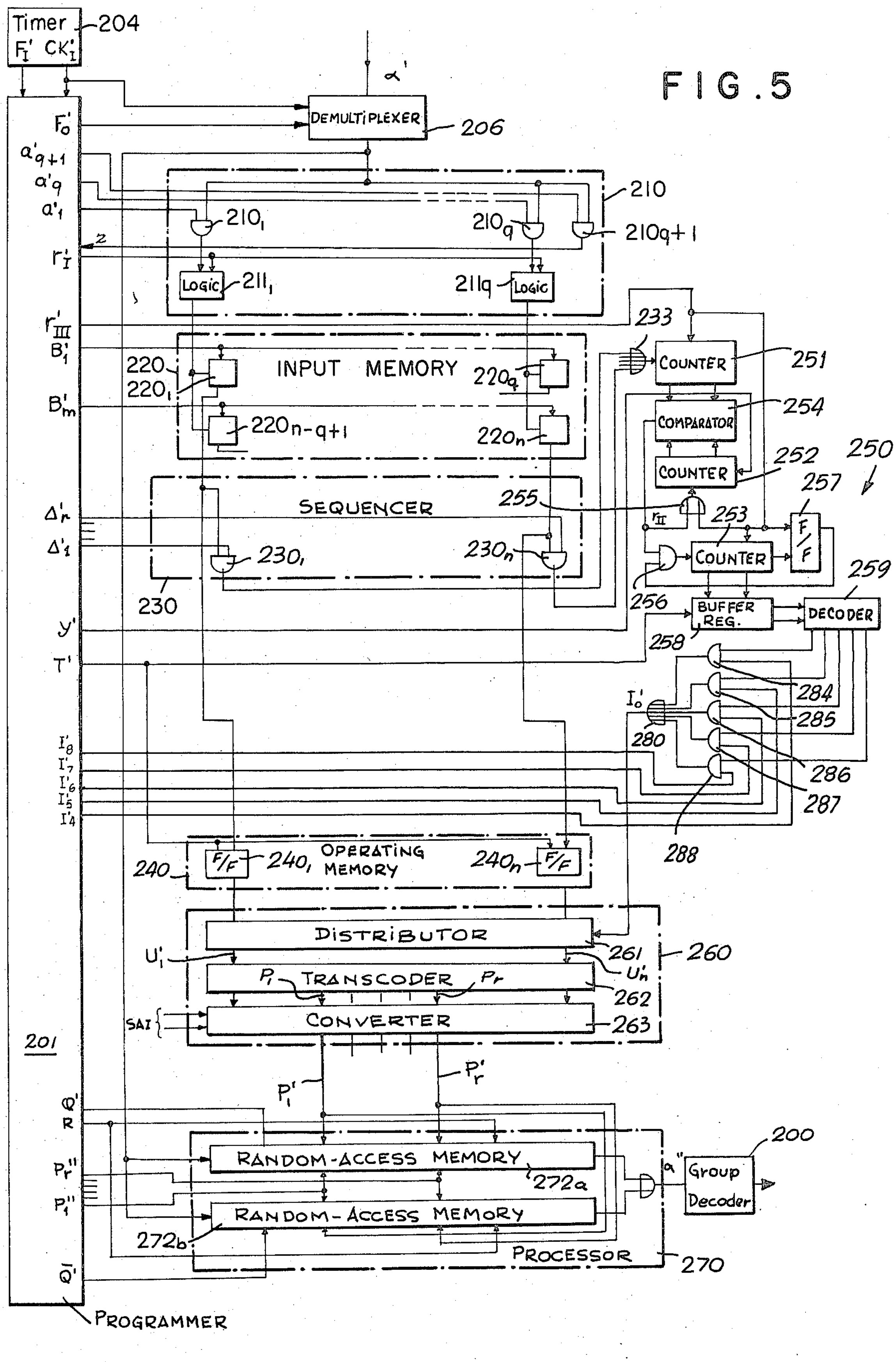

FIG. 5 shows the receiving side of a station included in the same system, i.e. another part of the station whose transmitting side is shown in FIG. 1 or a part of a corresponding station at a remote terminal.

Figure 6:
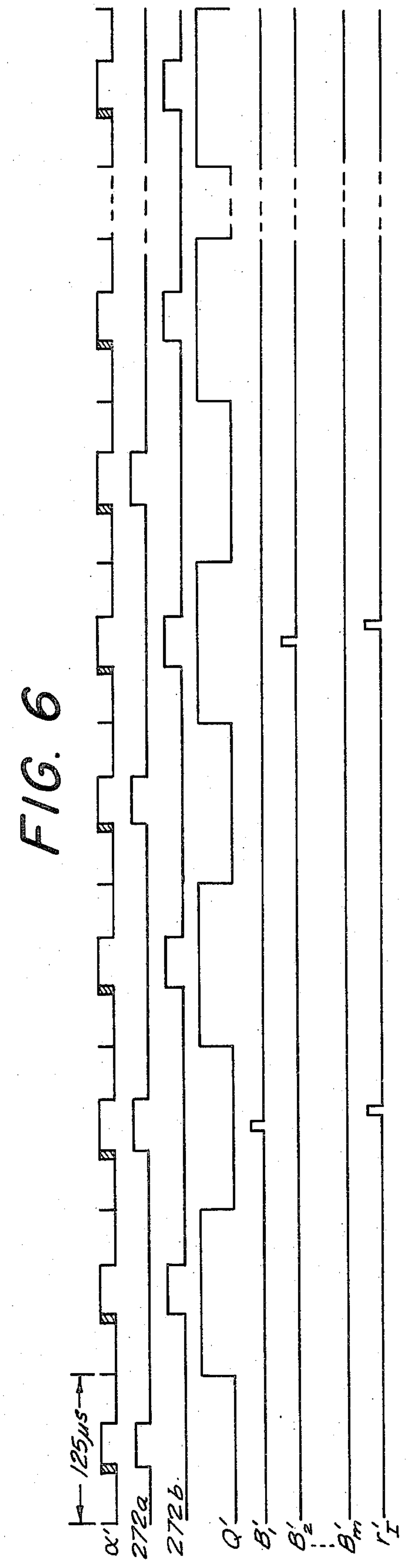
FIGS. 6, 7 and 8 are sets of graphs relating to the operation of the receiving circuits of FIG. 5.

An intermittent code sequence $\alpha'$ (FIG. 6), similar to that shown in FIG. 2, arrives via path 300 in interleaved relationship with other such sequences from which it is separated by a demultiplexer 206. The latter feeds this code sequence to a processor 270 and, in parallel therewith, to an allocation-message retriever 210 comprising a set of AND gates $210_I - 210_q$ as well as a further AND gate $210_{q+I}$ for extracting the allocation bits and the synchronization bit of message portion M. The AND gates are periodically unblocked by respective pulses $a'_I - a'_q$, $a'_{q+I}$ (see also FIG. 7) from a programmer 201, gates $210_I - 210_q$ working into respective logic circuits $211_I - 211_q$ which are designed as three-stage shift registers with majority-logic outputs so as to emit a pulse whenever at least two of their stages are loaded. In this way, transient changes in the allocation message do not affect the contents of an *n*-stage input memory 220 composed of an orthogonal array of stages $220_I - 220_n$ similar to the stages of the corresponding memory 130 in FIG. 1. Logic circuit $211_I$ feeds the first stage 220, . . . . $220_{n-q+I}$ of each row of this memory whereas logic circuit $211_q$ supplies the last stage $220_q$ . . . $220_n$ thereof. The loading of these rows is controlled by respective enabling pulses $B'_I - B'_m$ which are staggered three frames apart (see FIG. 6). Circuits $211_I - 211_q$ are reset by a pulse $r'_I$ from programmer 201 following each enabling pulse $B'_I - B'_m$.

A sequencer 230 comprises a set of *n* AND gates $230_I - 230_n$ receiving the outputs of respective stages $220_I - 220_n$ of input memory 220 upon being successively unblocked by pulses $\Delta'_I - \Delta'_n$ emitted by programmer 201 at the cadence of basic clock pulses $CK'_o$ from a timer 204 (which could be identical with timer 104 of FIG. 1).

Figure 7:
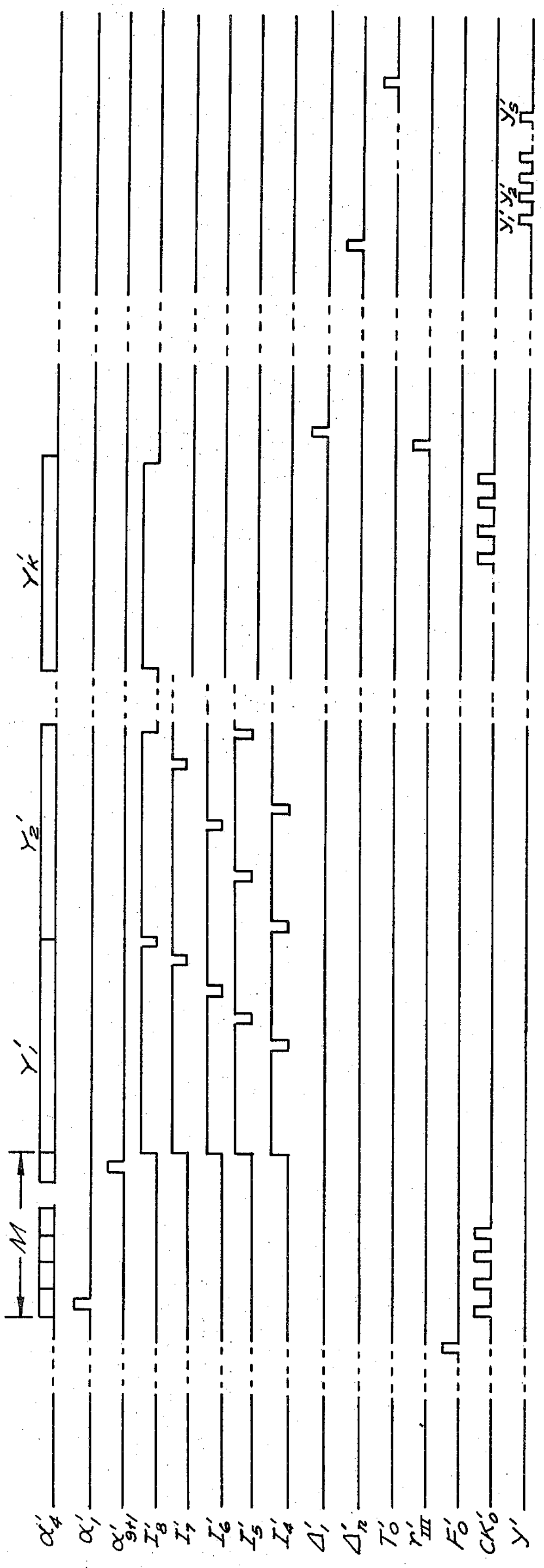
Figure 8:
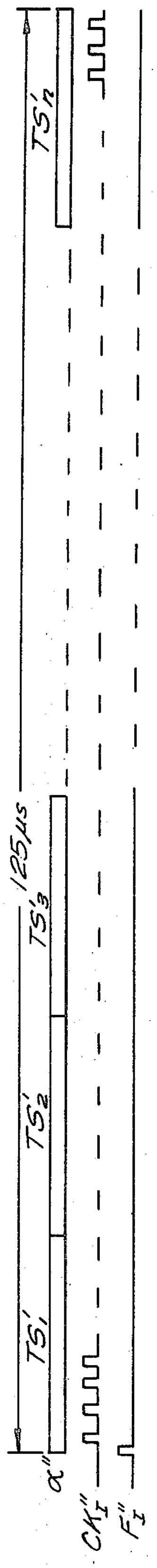

Memory stages $220_I - 220_n$ feed the setting inputs of respective flip-flops $240_I - 240_n$ of an operating memory 240 in response to a periodic enabling pulse T' at the end of the subframe. Memory 240, in turn, loads a distributor 261 in the presence of timing pulses on an output load $I'_o$ of an OR gate 280, coinciding with respective code words $Y_I - Y_k$ of the incoming code sequence $\alpha'$. According to the accompanying allocation message composed of bit combinations M, distributor 261 energizes certain of its output leads $U'_I - U'_n$ which terminate at a transcoder 262 working into a conversion network 263; units 261 – 263 form part of an address decoder 260. Network 263 also receives extraneous digital information SAI stored in the terminal equipment of the receiving station. Transcoder 262 has a multibit output $P_I - P_r$ identifying the active line represented by an energized output lead $U'_I - U'_n$ of distributor 261; conversion network 263 modifies the word $P_I - P_r$ in accordance with the digital instruction SAI to provide the address (bits $P'_I - P'_r$) to which a corresponding code word of message $\alpha'$ is to be delivered in either of two identical random-access memories 272*a*, 272*b* forming part of processor 270. These memories are alternately conditioned for writing by a signal Q' and its complement $\overline{Q}'$ emitted by the programmer 201. Writing at the rate of high-speed clock pulses $CK'_o$ from timer 204 thus alternates with reading, in response to a signal R from the programmer, at the rate of low-speed clock pulses $CK'_I$ emitted by the programmer; the cadence of pulses $CK_o$ at the transmitter and $CK'_o$ at the receiver is the same. The read-out is controlled by multibit words on programmer outputs $P''_I - P''_r$ that determine the sequence in which the code words stored in memories 272*a*, 272*b* are to be transmitted through an OR gate 271, as part of a continuous sequence $\alpha''$, to their respective destinations via a group decoder 200 and other conventional routing equipment not shown; FIG. 8 illustrates the regrouping of these code words in periods $TS'_I, TS'_2 \ldots TS'_n$ of the same length as the original sampling intervals $TS_I - TS_n$ of FIG. 3. FIGS. 7 and 8 also show start pulses $F'_o$ and $F'_I$ entering and leaving the programmer 201, which are the counterparts of pulses $F_o$ and $F_I$ shown in FIGS. 4 and 3, respectively.

OR gate 280 is supplied by an arithmetic unit 250 whose construction and operation is analogous to that of unit 150 in FIG. 1. Unit 250 comprises a first counter 251, receiving the output pulses of sequencer 230 through an OR gate 233, a second counter 252 working together with counter 251 into a comparator 254, and a third counter 253 which is stepped by a pulse $r'_{II}$ from comparator 254 in the presence of a match between the count $k$ of the true bits from sequencer 230 and the number $s$ of reference pulses $y'$ fed (at the rate of clock pulses $CK'_o$) in from programmer 201. Comparator pulse $r'_{II}$ also resets, through an OR gate 255, the counter 252 which is further resettable, along with counters 251 and 253 as well as a flip-flop 257, by a pulse $r'_{III}$ periodically emitted by the programmer. Flip-flop 257, when set after the counter 253 has reached its final count of numerical value 8, blocks an AND gate 256 in the input of that counter whose contents are delivered to the buffer register 258 for periodic transmittal to a decoder 259 in response to a command pulse here shown to coincide with the transfer pulse T'. Decoder 259 has five outputs terminating at respective AND gates 284, 285, 286, 287, 288 which work into OR gate 280, the second inputs of these AND gates being energized by respective timing pulses $I'_4$, $I'_5$, $I'_6$, $I'_7$, $I'_8$ from programmer 201. As will be noted from FIG. 7, timing pulses $I'_4 - I'_8$ are of the same length as their counterparts $I_4 - I_8$ in FIG. 3 but recur with only a short interruption designed to let the distributor DIS recognize their individuality. Moreover, the absolute length of pulses $I'_4 - I'_8$ is less than that of their counterparts at the transmitting end, corresponding to sequences of 4, 5, 6, 7 or 8 high-rate clock pulses $CK'_o$ rather than low-rate pulses $CK_I$.

The suppression of up to four bits of an 8-bit code word lowers, of course, the information content of the transmitted signals but still allows the transmission of intelligible speech. Thus, our present system permits up to 100 percent overloading, at the expense of progressive degradation of the message signals. In the case of still larger overloads, transmission would stop as the counters 153 and 253 could not advance beyond their third stage so that OR gates 180 and 280 would have no output.

The read-out from memories 272*a*, 272*b* at the cadence of clock pulses $CK'_I$, besides restoring the original blank codes of sequence $\alpha$, also introduces zeroes (or, if desired, one's) in the suppressed-bit positions of truncated code words forming part of sequence $\alpha'$.

Since the contents of input memory 130 change only every third frame, the transfer pulse $T_I$ also need not be generated more than once every three frames. The same applies, of course, to the updating of operating memory 240 from input memory 220.

The disclosed system may be expanded, if desired, to encompass a plurality of stations at each terminal, in the general manner described in the above-identified Monti application.

We claim:

1. A PCM voice-frequency telecommunication system with a first station and a second station linked with each other by a signal path for the transmission, in a recurrent message frame, of digitized message samples in the form of multibit pulse codes between groups of local voice channels served by said first station and groups of local voice channels served by said second station, comprising:

synchronized timing means at said first and second stations establishing recurrent frames and subframes;

a group coder for each group of a voice channels at said first station generating during each frame a continuous code sequence extending over $n$ sampling intervals and containing blank codes relating to inactive channels along with multibit code words representing the digitized message samples of all active channels of its group in a predetermined order, each of said code words consisting of a predetermined number $b_{max}$ of bits;

monitoring means at said first station for determining the activity of all $n$ channels of a group;

first processing means at said first station responsive to an activity pattern from said monitoring means for eliminating all blank codes from said continuous code sequence issuing from the corresponding group coder and consolidating the remaining code words thereof into code groupings forming part of an intermittent code sequence, each code grouping containing a maximum number of bits equaling the number of time slots allotted to the channel group in an assigned subframe within each message frame;

multiplexing means at said first station connected to said processing means for delivering said intermittent code sequence to said signal path in its assigned subframe and in interleaved relationship with similar code sequences from other channel groups;

first $n$-stage storage means individual to a channel group at said first station connected to said monitoring means for registering said activity pattern and further connected to said first processing means for controlling the elimination of said blank codes, said activity pattern including a characteristic bit for each active channel;

first sequencing means at said first station connected to be driven through $n$ steps per frame by said timing means for scanning said activity pattern during each frame with generation of a first output pulse upon the scan of each characteristic bit;

first arithmetic means at said first station connected to receive said first output pulses from said first sequencing means and for dividing the number $k$ of said first output pulses per frame into a predetermined number $s$ depending on the number of time slots allotted to the corresponding channel group, said first arithmetic means generating a first sequence of timing pulses of a duration depending on the quotient $s/k$, said first processing means being connected to said first arithmetic means for suppressing at least one bit in each of said remaining code words in response to said timing pulses upon the product $k \cdot b_{max}$ being less than said predetermined number $s$;

demultiplexing means at said second station connected to said signal path for recovering said intermittent code sequence from arriving message signals;

second processing means at said second station connected to said demultiplexing means for receiving said intermittent code sequence therefrom and reconverting same into a continuous code sequence with interspersed blank codes relating to inactive channels;

insertion means in said first processing means connected to said monitoring means for introducing an aliquot $q$-bit fraction of an $n$-bit allocation message, corresponding to said activity pattern, into each of said code groupings with transmission of a complete allocation message in the course of a predetermined frame series;

retrieval means at said second station connected to extract said $q$-bit fraction from said demultiplexing means for reconstituting said allocation message therefrom;

second $n$-stage storage means individual to a channel group at said second station connected to said retrieval means for registering a replica of said activity pattern and further connected to said second processing means for determining the time position of the individual code words of said intermittent code sequence in the continuous code sequence issuing from said second processing means;

second sequencing means at said second station connected to be driven through $n$ steps per frame by said timing means for scanning said replica during each frame with generation of a second output pulse upon the scan of each characteristic bit;

second arithmetic means at said second station connected to receive said second output pulses from said second sequencing means and for dividing the number $k$ of said second output pulses per frame into said predetermined number $s$, said second arithmetic means generating a second sequence of timing pulses of a duration varying proportionally with the duration of said first sequence of timing pulses, said second processing means being connected to said second arithmetic means for individualizing respective code words in said intermittent code sequence under the control of the last-mentioned timing pulses preparatorily to reconversion thereof into said continuous code sequence; and decoding means for said code words connected to said processing means.

2. A system as defined in claim 1 wherein each of said arithmetic means is provided with circuitry for producing a relatively long timing pulse upon $s/k \geq b_{max}$ and producing progressively shorter timing pulses upon the integral part of the quotient $s/k$ equaling $b_{max}-1$, $b_{max}-2$, etc., said relatively long timing pulse encompassing a series of $b_{max}$ bits in said continuous code sequence, said progressively shorter timing pulses encompassing periods of $b_{max}-1$ bits, $b_{max}-2$ bits, etc. respectively corresponding to the magnitude of said integral part.

3. A system as defined in claim 2 wherein each of said arithmetic means comprises a first pulse counter connected to receive said first output pulses from said first sequencing means, a second pulse counter connected to a source of reference pulses operative to deliver s reference pulses per frame, comparison means connected to both said first and said second counter for emitting a resetting pulse for said second counter upon the count of said reference pulses reaching said number $k$, and a third counter connected to receive said resetting pulse from said comparison means, said circuitry including a decoder connected to said third pulse counter.

4. A system as defined in claim 3 wherein said third pulse counter has $b_{max}$ stages, each of said arithmetic means further comprising blocking means responsive to a full loading of said third pulse counter for inhibiting the transmission of further resetting pulses to the latter from said comparison means.

5. A system as defined in claim 3 wherein said source of reference pulses is controlled by said timing means to generate said s reference pulses in a part of a frame following the stepping of the associated sequencing means.

6. A system as defined in claim 2 wherein said timing means includes a source of relatively slow clock pulses controlling the loading of said first processing means and the unloading of said second processing means, and a source of relatively fast clock pulses controlling the unloading of said first processing means and the loading of said second processing means, the number of bits encompassed by the timing pulses of said first arithmetic means being counted at the rate of said relatively slow clock pulses, the number of bits encompassed by the timing pulses of said second arithmetic means being counted at the rate of said relatively fast clock pulses.

7. A system as defined in claim 1 wherein each of said storage means comprises an $n$-stage input memory and an $n$-stage operating memory inserted between said input memory and the associated processing means, said operating memory being provided with enabling inputs connected to said timing means for periodically updating the contents of its $n$ stages from the contents of corresponding stages of said input memory.

8. A system as defined in claim 7 wherein each of said sequencing means comprises a set of gates connected to respective stage outputs of the associated input memory.

9. A system as defined in claim 1 wherein said monitoring means is controlled by said timing means to update the contents of said first input memory during a succession of $p$ consecutive frames, $p$ being an integer greater than 1, said predetermined frame series encompassing $np/q$ frames, said retrieval means including logic means for evaluating said $q$-bit fraction during corresponding successions of $p$ consecutive frames.

10. A system as defined in claim 9, further comprising synchronization means at said first station controlled by said timing means for insertion of a synchronizing bit into each of said code grouping once every $p$ frames, said retrieval means including detector means for said synchronizing bit.

* * * * *